United States Patent [19]

Bronsvatch

[11] Patent Number: 5,317,559
[45] Date of Patent: May 31, 1994

[54] DUAL PIVOT DISC DRIVE APPARATUS AND METHOD

[75] Inventor: Efim Bronsvatch, Saratoga, Calif.

[73] Assignee: Seagate Technology, Inc., Scotts Valley, Calif.

[21] Appl. No.: 906,037

[22] Filed: Jun. 26, 1992

Related U.S. Application Data

[63] Continuation of Ser. No. 497,395, Mar. 22, 1990, abandoned.

[51] Int. Cl.$^5$ .......................... G11B 5/55; G11B 21/08
[52] U.S. Cl. ...................................... 369/244; 360/106
[58] Field of Search ............... 369/176, 244, 247, 249, 369/250, 251, 253; 360/106

[56] References Cited

U.S. PATENT DOCUMENTS

| | | | |
|---|---|---|---|
| 3,865,987 | 2/1975 | Yamamoto et al. | 360/106 |
| 4,393,425 | 7/1983 | Wright | 360/106 |
| 4,423,446 | 12/1983 | Takahashi | 360/104 X |
| 4,491,890 | 1/1985 | Rudi | 360/104 X |
| 4,528,607 | 7/1985 | Thompson | 360/106 |
| 4,745,504 | 5/1988 | Foote | 360/106 |
| 4,750,067 | 6/1988 | Gerfast | 360/104 X |
| 4,845,579 | 7/1989 | Wilkinson, Jr. | 360/106 |
| 4,855,992 | 8/1989 | Ikegawa et al. | 346/135.1 X |
| 4,881,140 | 11/1989 | Ghose et al. | 360/106 |
| 4,881,141 | 11/1989 | Hasegawa et al. | 360/106 |
| 4,939,013 | 7/1990 | Kimura et al. | 346/135.1 X |
| 4,954,379 | 9/1990 | Nishida et al. | 346/135.1 X |
| 4,956,213 | 9/1990 | Masuda | 346/135.1 X |
| 4,956,214 | 9/1990 | Imataki et al. | 346/135.1 X |
| 4,956,216 | 9/1990 | Hausler et al. | 346/135.1 X |
| 4,975,355 | 12/1990 | Suzuki | 346/135.1 X |
| 4,985,289 | 1/1991 | Kamezaki et al. | 346/135.1 X |

FOREIGN PATENT DOCUMENTS

| | | | |
|---|---|---|---|
| 828925 | 1/1952 | Fed. Rep. of Germany | 369/176 |
| 1388200 | 12/1964 | France | 369/244 |

*Primary Examiner*—Davis L. Willis
*Assistant Examiner*—Edward H. Sikorski
*Attorney, Agent, or Firm*—Flehr, Hohbach, Test, Albritton & Herbert

[57] ABSTRACT

A dual pivot mechanism for a disc drive having a base plate and an actuator arm driven by a pinion for moving a transducer head across a disc to read and write to the disc. One end of the pivot arm is pivotally connected to the actuator arm opposite the pinion, another end of the pivot arm has a fixed pivot connection to the base plate, the pivotal connection to the actuator arm being fixed axially. A constant preload mechanism is provided for biasing the pivot arm so that the actuator arm is in constant contact with the pinion.

13 Claims, 2 Drawing Sheets

DUAL PIVOT DISC DRIVE APPARATUS AND METHOD

This is a continuation of application Ser. No. 07/497,395 filed on Mar. 22, 1990 now abandoned.

FIELD OF THE INVENTION

The present invention is directed generally to the field of disc drives incorporating rotary actuators, and more particularly to an improved pivot mechanism for the actuator.

BACKGROUND OF THE INVENTION

Disc drive machines record and reproduce information stored on concentric circles or spiral tracks on magnetic or optical discs. Data is stored on tracks and is written and read by magnetic heads which must be accurately positioned over one of the tracks on the surface of the disc. The head or transducer, is supported by a flexure to fly over the surface of the disc, the flexure being incorporated in an actuator which responds to signals from a host computer to position the transducer over a selected track. Both linear and rotary actuators have been used for this purpose, but rotary actuators are especially useful in disc drives with small physical dimensions.

A common form of rotary actuator is a V-shaped dual arm assembly. One arm includes a head arm, flexure, and read/write transducer extending out from a pivot toward the tracks on the disc. Extending toward the pivot to form the V-shaped arm assembly is an actuator arm which is coupled to an actuator motor. Rotation of the motor moves the actuator arm and thereby the entire V-shaped assembly, moving the head from track to track. Such rotary actuator mechanisms require a very stable pivot mechanism to support the actuator arm and head support arm; any instability would produce serious positioning inaccuracies.

The pivot mechanism in prior art rotary actuators generally consists of a shaft supporting the juncture of two arms, i.e., an actuator drive arm coupled to the actuator motor and head arm. The pivot point of the actuator arm and head support arm are typically mounted for rotation about this fixed common pivot point. However, assembly of this pivot mechanism is expensive and time consuming to accomplish with proper alignment.

Another problem is that the actuator arm is fit tightly between the fixed pivot point and the pinion which is fit on the end of the actuator motor shaft to drive the actuator arm. This pinion, although designed to be perfectly round, always contains some tolerances which make it oval or otherwise not perfectly circular. This non-circularity causes the actuator arm to be pinched between the fixed pivot point and the pinion. The non-circularity also produces extraneous slack between the gear section of the actuator arm and the pinion, leading to premature wear of the gear section. Both of these conditions, i.e., pinching and slack, have deleterious effects on the actuator arm assembly by inducing undesired stress and wear. The effects of a non-circular pinion are generally referred to as runout.

Attempts to compensate for the effects of runout include those of U.S. Pat. No. 4,845,579 for a Disc Drive Incorporating Automatic Wear Compensation for a Pivoted Arm, by Richard A. Wilkinson, Jr., issued Jul. 4, 1989. In this configuration, the actuator arm and drive motor pinion are biased into engagement by a spring force exerted directly along the axis of the elongated actuator arm. Although this configuration relieves some of the problems induced by a rigidly fixed pivot point, the arrangement is still plagued by the effects of runout and is hampered by friction and wear of its plurality of parts. Furthermore, the configuration is more susceptible to the effects of differential thermal expansion.

A second prior art attempt has been to provide a leaf spring on one side of the pivot point, generally perpendicular to the longitudinal axis of the actuator arm.

There are also several undesirable aspects induced by the leaf spring mechanism. The tolerance of the spring steel used to create the leaf spring is very hard to maintain within critical limitations, as a result, the preload of the spring on the arm varies. Furthermore, since the leaf spring contains a certain amount of twist, a cantilever spring is required to keep the actuator arm from rising vertically. Moreover, mounting the leaf spring to the pivot mechanism requires high precision spot welding which is both time consuming and expensive.

SUMMARY OF THE INVENTION

Accordingly, it is an object of the present invention to provide a disc drive pivot mechanism having a constant preload, regardless of the shape of the pinion.

It is another object of the present invention to provide a disc drive pivot mechanism which is fixed along a critical axis to prevent misalignment, yet compensates for runout, thermal expansion and similar phenomenon.

It is another object of the present invention to provide a disc drive pivot mechanism which is simple to manufacture, install and test.

It is yet another object of the present invention to provide a disc drive pivot mechanism which has a hard pivot contact and is, therefore, not susceptible to resonance.

The attainment of these and related objects may be achieved through use of a novel dual pivot disc drive mechanism as herein disclosed. The dual pivot disc drive mechanism in accordance with this invention has a disc drive having a base plate and an actuator arm driven by a pinion for moving a transducer head across a disc to read and write to the disc. One end of the pivot arm supports the end of the actuator arm opposite the pinion at a pivot link. The other end of the pivot arm distal from the actuator arm is pivoted to the base plate. The pivotal connection of the pivot arm to the actuator arm is fixed axially so that the position of the transducer head remains in proper alignment with the tracks. A constant preload mechanism is provided for biasing the pivot arm so that the actuator arm is in constant contact with the pinion.

The attainment of the foregoing and related objects, advantages and features of the invention should be more readily apparent to those skilled in the art, after review of the following more detailed description of the invention, taken together with the drawings.

DETAILED DESCRIPTION OF THE PREFERRED EMBODIMENT

Figure 1:
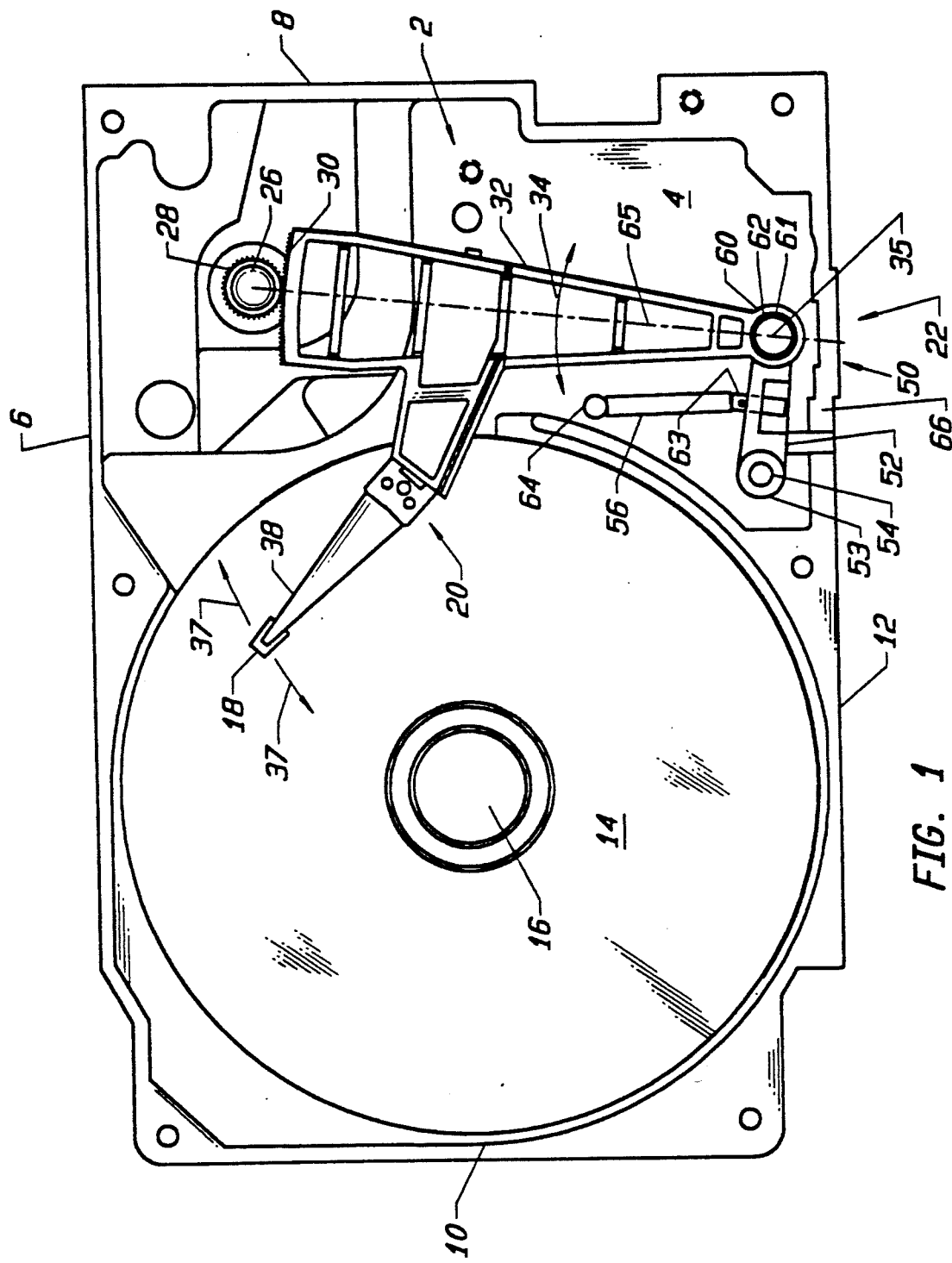
FIG. 1 is a top view of the dual pivot disc drive mechanism of the preferred embodiment.

In the figures, like components are designated by like reference numerals. Referring to FIG. 1, the major elements of the disc drive are shown including a housing 2 having a base plate 4 and upright walls 6, 8, 10, 12. The integral casting for the base of this disc drive is generally known in the art.

A data storage disc 14 is mounted within the housing and rotates on a spindle 16. A transducer 18 is provided for reading and writing data on the disc 14. The transducer 18 is positioned using an elongate actuator arm assembly combination generally indicated at 20. The arm assembly 20 pivots around a biasing mounting mechanism 22, including a unique arm preload device described in detail below. This pivoting movement of arm assembly 20 is caused by rotation of an actuator motor (not shown) mounted beneath the base plate 4, having a shaft 26 extending up through the base plate 4. The actuator motor shaft 26 has a pinion 28 machined thereon to mesh with gear sector 30 on an end of actuator arm 32. Rotation of the motor pinion 28 across the face of the gear sector 30 causes movement of the arm assembly 20 generally along the arc illustrated by arrow 34. As the actuator arm 32 moves, it pivots about a pivot point 35 to move the transducer 18 supported on an end of flexure 38 extending from the side of arm 32 from track to track along arc 37.

Referring more specifically to the dual pivot mechanism 50, the dual pivot mechanism 50 is comprised of a plurality of parts including the axially fixed pivot 35, pivot lever 52, pivot lever shaft 54 and preload spring 56. The dual pivot mechanism 50 is configured to provide a constant preload on the actuator arm along axis 65 so that the teeth which form the gear sector 30 on the end of actuator arm 32 are held in constant contact with the pinion 28. This is accomplished by providing an axially fixed pivot 35 for said arm 32, i.e., the pivot point is maintained on the long axis 65 of the arm, so that mistracking of the transducer 18 does not occur. The gear sector 30 is located distal the axially fixed pivot 35.

The spring rate of preload spring 56, which biases the gear section 30 to the pinion 28, is such that it provides for the runout of the non-circular configuration of the pinion while maintaining the gear sector 30 of the actuator arm 32 in constant contact with the pinion 28. This advantage is obtained without inducing unnecessary stress or wear on the actuator or pivot mechanisms. Particularly, in this configuration, pinching of the actuator arm between the pinion and the pivot 35 is alleviated.

The end of the actuator arm 32, closest the pivot 35, contains a shaft receptor 60. The shaft receptor 60 is basically a cylindrical receptor having a cylindrical opening therethrough for joining to the primary pivot shaft 62 of pivot arm 52. The shaft receptor 60 has a plurality of ball bearings therein so that the shaft receptor 60 may be journaled to pivot shaft 62, while allowing actuator arm 32 and shaft receptor 60 to rotate freely about pivot shaft 62. The pivot shaft 62 which extends up into the pivot receptor 60 is solidly connected to an integral part of pivot arm 52. The pivot shaft 62 is rotatably mounted through a set of ball bearings, in housing 61, to the pivot receptor 60 so that no lateral play or tilt occurs between actuator arm 32 and shaft 62.

The end 53 of the pivot arm 52, distal from actuator arm 32, is rotatably mounted or journaled about the secondary pivot shaft 54 which extends up from and is an integral part of base casting 4.

Since both the primary pivot, i.e., actuator arm 32 pivoting on pivot shaft 62 (of pivot lever 52), and the secondary pivot, i.e., pivot lever 52 pivoting on pivot shaft 54, are mechanical-shaft connections, there is de minimis vertical play or tilt induced in the actuator arm 32, in contrast to the leaf spring configuration of the prior art. Therefore, a cantilever spring is not required to hold the actuator arm 32 and its gear sector 30 in vertical alignment with pinion 28.

As evident from FIG. 1, the constant preload spring 56 is connected to the pivot arm 52 with connector 63. Connector 63 is basically a screw which is mounted through a hole 69 in pivot arm 52. The screw 63 permits the tension on spring 56 to be adjusted by adjusting the threading of screw 63 in hole 69.

The preload spring 56 is connected between the connector 63 and mounting pin 64. The mounting pin 64 is a rigid, fixed protrusion which may either be molded into the base plate 4 or added thereafter.

The pin 64 is located so that the spring 56 extends generally parallel to the axis 65 of the actuator arm 32, thus biasing actuator arm 32 into contact with pinion 28 and motor shaft 26. A stopper 66 is provided to prevent the pivot arm 52 from moving too much (as a result of shock or other force) to disengage the gear section 30 from the pinion 28.

The spring 56 is a coil spring. In a preferred embodiment, the spring rate is approximately 145 grams per inch ±5%. Ideal spring characteristics include a low spring rate which means a relatively constant spring force over a broad length of expansion.

In this configuration, the pivot point 35 remains fixed along the axis 65 of the actuator arm. Maintaining the pivot point on the axis is essential to keep the transducer 18 on the designated track and thus to facilitate accurate reading and writing of information to the disc 14. Although the pivot point 35 of the actuator arm 32 may move along the axis 65 in response to runout, thermal expansion and shock, it will not significantly move out of axis 65. The use of a coil spring 56 as opposed to a leaf spring provides for a much greater degree of control in the amount of preload (or biasing) since the tolerances of coil springs are much more readily controlled. Additionally, the installation of coil springs is much easier than leaf springs since coil springs do not have to be welded into place.

Additional advantages of the present invention include the utilization of less expensive materials, less expensive tooling, decrease assembly manpower and no adjusting of preload force, as required in prior art devices.

Figure 2:
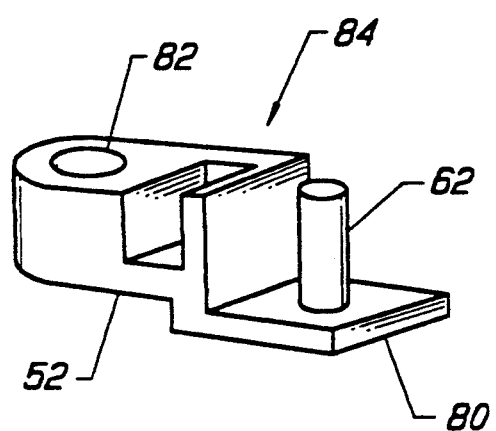
FIG. 2 is a perspective view of the pivot arm of the dual pivot disc drive mechanism of the preferred embodiment.

Referring to FIG. 2, a perspective view of the pivot arm 52 of the dual pivot disc drive of the present invention is shown. The physical characteristics of the pivot arm illustrate how the attachments are made (1) between the actuator arm 32 and pivot arm 52 and (2) between the pivot arm 52 and pivot shaft 54 which is fixedly mounted to the baseplate 4 for securing the position of the arm assembly 30.

The pivot arm 52 has a bottom plate 80 which extends below the main portion of the pivot arm 52 into a recess (not shown) in the baseplate 4. The recess in the baseplate 4 for the bottom plate 80 is large enough and deep enough to accommodate the thickness of the bottom plate 80 and its range of motion under normal operation. The pivot shaft 62 extends upward from the bottom plate 80 to penetrate pivot receptor 60 (of FIG. 1) thereby rotatably mounting the receptor 60 and actuator arm 32 for rotation thereabout.

The other end of the pivot arm 52 contains a cylindrical opening which is referred to as pivot receptor 82. Pivot receptor 82 receives pivot shaft 54 (of FIG. 1) in much the same manner as pivot receptor 60 receives pivot shaft 62 (discussed above). The pivot arrangement permits pivot arm 52 to pivot in a plane, but prevents tilt from being induced into the pivot arm 52. A pivot arm 52 without tilt facilitates an actuator arm 32 without tilt, which produces a transducer 18 that is aligned with the tracks on disc 18.

A region 84 is provided in the pivot arm 52 for the connector 63 (of FIG. 1). The connector 63 is threaded through a hole (69 of FIG. 1) to connect the spring 56 to the pivot arm, although obviously many other expedients for attaching coil spring 56 to pivot arm 52 are available.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A rotary actuator head positioning apparatus located within a housing of a disc drive comprising means for positioning a transducer relative to a disc-shaped recording medium within said housing, including:

pivot arm assembly extending along the side of said disc-shaped recording medium movable in the housing for positioning the transducer;

a transducer mounting arm extending to one side of said pivot arm assembly and over said disc-shaped recording medium, said pivot arm assembly being movable in said housing in a plane parallel to said disc-shaped recording medium for positioning said transducer relative to said disc-shaped recording medium;

one pivot end of said pivot arm assembly having a first pivot aperture lying on a long central axis of said pivot arm assembly for receiving a first pivot pin;

motor means mounted in said housing and comprising a motor coupled to a driven end of said pivot arm assembly distal from said pivot arm assembly pivot end;

pivot arm means comprising 1) said first pivot pin extending from a first end, 2) a second pivot aperture distal from said first pivot pin on a second end, and 3) a second pivot pin;

said first pivot pin pivotally disposed in said first pivot aperture of said pivot end, said second pivot aperture for receiving said second pivot pin, said second pivot pin fixably attached to a base of said housing, whereby said pivot arm assembly is pivotal about said first pin allowing for movement of said pivot arm assembly along said driven end perpendicular to said long central axis, and said pivot arm means is pivotal about said second pivot pin allowing for movement of said pivot arm assembly along said long central axis; and preload means for applying a biasing force to said pivot arm assembly along the long axis of said assembly so that said driven end of said assembly is held in contact with said motor means, said preload means coupled to said pivot arm means at a point spaced from said pivot arm assembly.

2. The apparatus of claim 1 wherein said motor means comprises a motor having a drive shaft extending up through the base of said housing, and means for coupling said shaft to the driver end of said arm to position said arm and thereby said transducer.

3. The apparatus of claim 2 wherein a pinion is provided on said shaft and a gear sector on an end of said pivot arm assembly, said preload means biasing said gear sector in contact with said pinion.

4. The apparatus of claim 3 wherein said second end of said pivot arm means distal from said axially fixed pivot of said pivot arm assembly is pivotally supported on a base of said housing and wherein said gear sector is located distal to said axially fixed pivot, so that preload means may effectively bias said gear sector into engagement with said pinon means.

5. The apparatus of claim 1 wherein said pivot arm means extends substantially at a right angle to and is pivotally coupled to said pivot end of said pivot arm assembly on said fixed axis of said pivot arm assembly, said preload means being coupled to said pivot arm means at a point spaced from said pivot arm assembly.

6. The apparatus of claim 5 wherein said preload means comprises a preload spring having one end attached to said spaced point on said pivot arm means and another end attached to a fixed point on a base of said housing.

7. The apparatus of claim 6 wherein said motor has a drive shaft with a pinion thereon, and said preload spring extends substantially parallel to said long axis of said pivot arm assembly to bias and maintain said pivot arm assembly in contact with said pinion.

8. A dual pivot apparatus for a disc drive having a base plate, comprising:

actuator arm means driven by a pinion means for moving a transducer head mounted to said actuator arm means across a disc to read and write to said disc, said actuator arm means including a pivot aperture distal from said pinion means for receiving a first pivot pin;

pivot arm means comprising 1) said first pivot pin extending from a first end, and 2) a second pivot aperture distal from said first pivot pin on a second end of said pivot arm means, said first pivot pin of said first end of said pivot arm means pivotally disposed within said first pivot aperture in said actuator arm means opposite said pinion means, said second end of said pivot arm means having a fixed pivot connection to said base plate, said fixed pivot connection to said pivot arm means being fixed axially; and preload means for biasing said pivot arm means so that said actuator arm means is in constant contact with said pinion means, said preload means coupled to said pivot arm means at a point spaced from said actuator.

9. The apparatus of claim 8 wherein a motor means is provided for driving said pinion means, said motor means having a drive shaft extending up through the base of a housing of a disc drive, said pinion being formed on an end of said drive shaft distal said drive motor.

10. The apparatus of claim 9 wherein said pinion means is provided on said shaft and said gear sector on an end of said actuator arm means, said preload means biasing said gear sector in contact with said pinion so that said motor means can position said transducer by positioning said actuator arm means.

11. The apparatus of claim 8 wherein said preload means comprises a coil spring having one end attached to a spaced point on said pivot arm means and another end attached to a fixed point on said base plate.

12. The apparatus of claim 11 wherein said preload means extends substantially parallel to a long axis of said actuator arm means to bias and maintain said actuator arm in contact with said pinion means.

13. The apparatus of claim 8 wherein said second end of said pivot arm means distal from said actuator arm means is pivotally supported on a base plate, said preload means being attached to said pivot arm means to effectively bias said gear sector of said actuator arm means into engagement with said pinion means.

* * * * *